United States Patent
Ogura et al.

(10) Patent No.: US 11,776,445 B2
(45) Date of Patent: Oct. 3, 2023

(54) IMAGE PROCESSING DEVICE AND IMAGE PROCESSING METHOD

(71) Applicant: Saturn Licensing LLC, New York, NY (US)

(72) Inventors: Toshiyuki Ogura, Tokyo (JP); Hiroaki Eto, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/621,961

(22) PCT Filed: Jul. 1, 2020

(86) PCT No.: PCT/JP2020/025822
§ 371 (c)(1),
(2) Date: Dec. 22, 2021

(87) PCT Pub. No.: WO2021/006146
PCT Pub. Date: Jan. 14, 2021

(65) Prior Publication Data
US 2022/0254290 A1 Aug. 11, 2022

(30) Foreign Application Priority Data
Jul. 10, 2019 (JP) ................................ 2019-128042

(51) Int. Cl.
*G09G 3/20* (2006.01)
*G06T 7/20* (2017.01)
(52) U.S. Cl.
CPC ................. *G09G 3/20* (2013.01); *G06T 7/20* (2013.01); *G09G 2340/0435* (2013.01)

(58) Field of Classification Search
CPC .............. G06T 7/20; G09G 2320/0626; G09G 2320/103; G09G 2340/0435; G09G 3/20; H04N 7/0127; H04N 7/0137
See application file for complete search history.

(56) References Cited

U.S. PATENT DOCUMENTS

2018/0077416 A1\* 3/2018 Hong .................... H04N 19/124
2018/0310022 A1\* 10/2018 Edpalm ................ H04N 19/105

FOREIGN PATENT DOCUMENTS

EP 2046029 A2 4/2009
EP 2234402 A2 9/2010
(Continued)

OTHER PUBLICATIONS

International Search Report for PCTJP2020025822 dated Sep. 24, 2020, 2 pgs.

*Primary Examiner* — Insa Sadio
(74) *Attorney, Agent, or Firm* — Lerner David LLP

(57) ABSTRACT

It is intended to make it possible to make a favorable display of, for example, images of low frame-rate content, with a high-luminance and high-contrast television set.
On the basis of an image stream having a first frame rate, for each frame, an object having luminance exceeding a luminance threshold value and/or a motion amount exceeding a motion-amount threshold value is detected as a target object. An image stream having a second frame rate larger than the first frame rate is acquired by inserting, between every pair of two consecutive frames in the image stream having the first frame rate, a predetermined number of frames of interpolated images obtained by performing motion compensation for causing the target object to sequentially move.

21 Claims, 10 Drawing Sheets

(56) References Cited

FOREIGN PATENT DOCUMENTS

| | | |
|---|---|---|
| JP | 2009058785 A | 3/2009 |
| JP | 2009093012 A | 4/2009 |
| WO | 2010067519 A1 | 6/2010 |

* cited by examiner

IMAGE PROCESSING DEVICE AND IMAGE PROCESSING METHOD

CROSS-REFERENCE TO RELATED APPLICATIONS

This application is a national phase entry under 35 U.S.C. § 371 of International Application No. PCT/JP2020/025822 filed Jul. 1, 2020, which claims the priority from Japanese Patent Application No. 2019-128042 filed in the Japanese Patent Office on Jul. 10, 2019, the entire contents of which are hereby incorporated by reference.

TECHNICAL FIELD

The present technology relates to an image processing device and an image processing method and, more particularly, relates to an image processing device and an image processing method that involve frame rate conversion.

BACKGROUND ART

For example, in PTL 1, it is stated that converting a 60 Hz frame-rate image stream into a 120 Hz frame-rate image stream by inserting an intermediate frame image between every pair of two consecutive frames in the 60 Hz frame-rate image stream makes display of moving images smooth. Further, in PTL 1, it is stated that inserting a black image frame into a portion corresponding to the intermediate frame image achieves a sharp image quality peculiar to movie content (film images). In the case where a black image frame is inserted as the intermediate frame image, there is a disadvantage that overall luminance is lowered.

CITATION LIST

Patent Literature

[PTL 1]
Japanese Patent Laid-open No. 2009-058785

SUMMARY

Technical Problem

An object of the present technology is to make it possible to make a favorable display of, for example, images of low frame-rate content, with a high-luminance and high-contrast television set.

Solution to Problem

The concept of the present technology lies in an image processing device including a target-object detection processing section that, on the basis of an image stream having a first frame rate, detects, for each frame, an object having luminance exceeding a luminance threshold value and/or a motion amount exceeding a motion-amount threshold value, as a target object; and an interpolated-image insertion processing section that acquires an image stream having a second frame rate larger than the first frame rate by inserting, between every pair of two consecutive frames in the image stream having the first frame rate, a predetermined number of frames of interpolated images obtained by performing motion compensation for causing the target object to sequentially move.

In the present technology, by the target-object detection processing section, on the basis of the image stream having the first frame rate, for each frame, the object having luminance exceeding the luminance threshold value and/or a motion amount exceeding the motion-amount threshold value is detected as the target object. For example, the luminance threshold value may include a maximum value of object luminance at which judder (strobing) is unnoticeable in the image stream having the first frame rate. Further, for example, the motion-amount threshold value may include a maximum value of an object motion amount at which judder (strobing) is unnoticeable in the image stream having the first frame rate. Further, for example, the luminance threshold value and the motion-amount threshold value may each include a variable that changes according to an environment.

By the interpolated-image insertion processing section, the image stream having the second frame rate larger than the first frame rate is acquired by inserting, between every pair of two consecutive frames in the image stream having the first frame rate, the predetermined number of frames of interpolated images obtained by performing the motion compensation for causing the target object to sequentially move. For example, the interpolated-image insertion processing section may cause a movement amount of the target object in the predetermined number of interpolated images to be changed according to the luminance and/or the motion amount of the target object.

Further, for example, the image stream having the first frame rate may include an image stream having a frame rate of 24 Hz and related to movie content. In this case, for example, the second frame rate may include an image stream having a frame rate of 120 Hz.

In the present technology, in such a way as described above, the image stream having the second frame rate larger than the first frame rate is acquired by inserting, between every pair of two consecutive frames in the image stream having the first frame rate, the predetermined number of frames of interpolated images obtained by performing the motion compensation for causing the target object, which is the object having the luminance exceeding the luminance threshold value and/or the motion amount exceeding the motion-amount threshold value, to sequentially move. Thus, even with a high-luminance and high-contrast television set, it is possible to make a favorable display of, for example, images of movie content, in a state in which judder is unnoticeable but movie-like motion characteristics remain.

In addition, in the present technology, for example, a display panel that displays the image stream having the second frame rate may further be provided. In this case, for example, the display panel may include a 4 K-size or 8 K-size display panel. Further, in the present technology, the image stream having the first frame rate may be acquired by reception of a broadcasting signal, reproduction from a storage, or communication. Further, in the present technology, the target-object detection processing section may detect, as the target object, an object having a size exceeding a size threshold value in addition to luminance exceeding the luminance threshold value and/or a motion amount exceeding the motion-amount threshold value.

DESCRIPTION OF EMBODIMENT

Hereinafter, a mode for carrying out the present invention (hereinafter referred to as an "embodiment") will be described. Note that the description will be made in the following order.

1. Embodiment
2. Modification examples

<1. Embodiment>

[Basic Description of the Present Technology]

Figure 1:
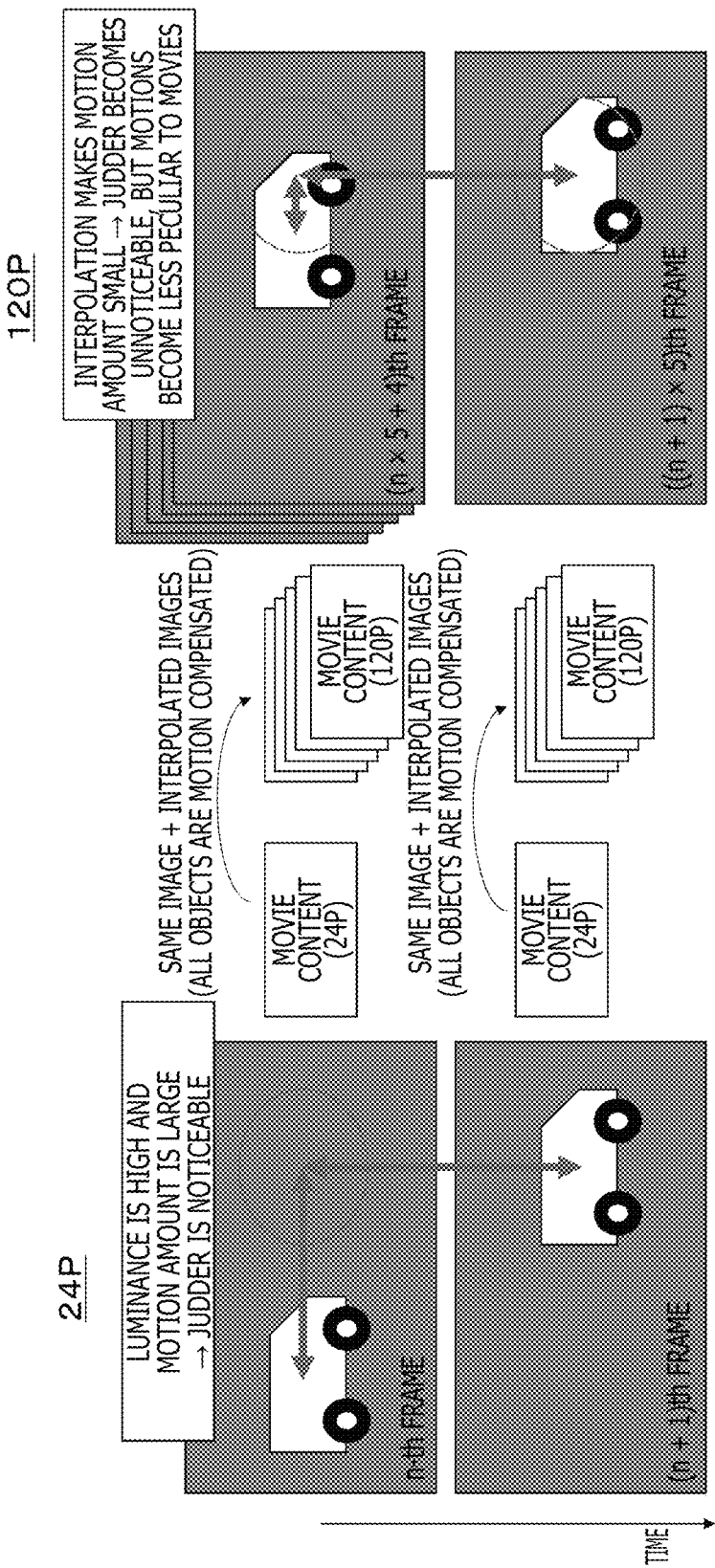
FIG. 1 is a diagram illustrating an example of frame rate conversion for converting a 24 Hz (24 P) frame-rate movie-content image stream into a 120 Hz (120 P) frame-rate image stream, according to a conventional technology.

FIG. 1 illustrates an example of frame rate conversion for converting a 24 Hz (24 P) frame-rate movie-content image stream into a 120 Hz (120 P) frame-rate image stream, according to a conventional technology. In display of the 24 P frame-rate image stream, motion amounts are large, and judder is noticeable. The 120 P frame-rate image stream is obtained by inserting, between every pair of two consecutive frames in the 24 P frame-rate image stream, four frames of interpolated images obtained by performing motion compensation for sequential movements on the whole of the images. In this case, the interpolation makes motion amounts between the frames small, so that judder becomes unnoticeable, but motions become less peculiar to movies.

Figure 2:
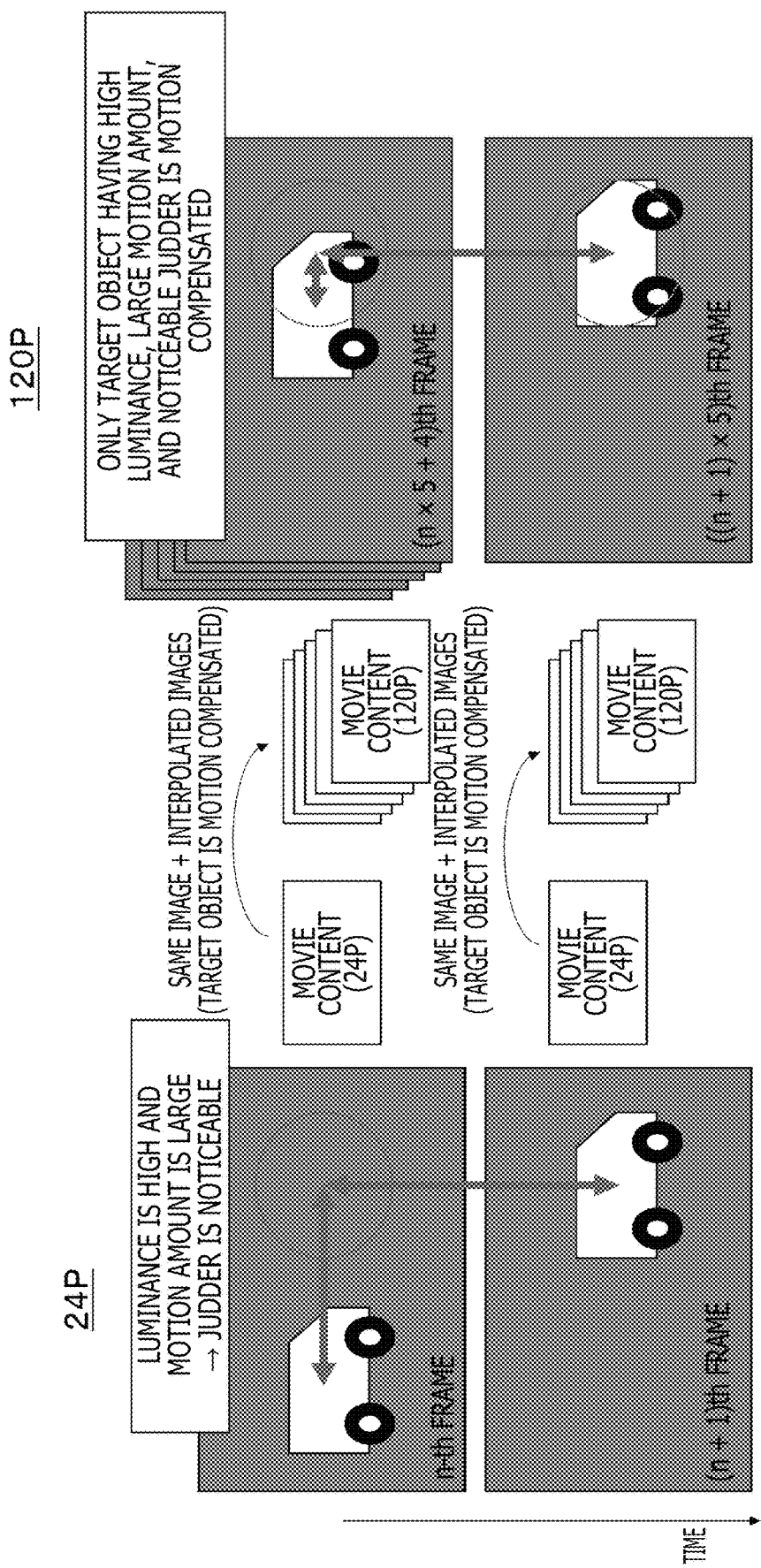
FIG. 2 is a diagram illustrating an example of frame rate conversion for converting a 24 Hz (24 P) frame-rate movie-content image stream into a 120 Hz (120 P) frame-rate image stream, according to the present technology.

FIG. 2 illustrates an example of frame rate conversion for converting a 24 Hz (24 P) frame-rate movie-content image stream into a 120 Hz (120 P) frame-rate image stream, according to the present technology. In this example, a first frame rate corresponds to 24 Hz, and a second frame rate corresponds to 120 Hz. The 120 P frame-rate image stream is obtained by inserting, between every pair of two consecutive frames in the 24 P frame-rate image stream, four frames of interpolated images obtained by performing motion compensation for sequential movements only on a target object that has high luminance and a large motion amount, that is, in which judder is noticeable. In this case, since the motion compensation is performed only on a portion corresponding to the object in which judder is noticeable, the judder becomes unnoticeable and motions peculiar to movies can be maintained.

Figure 3:
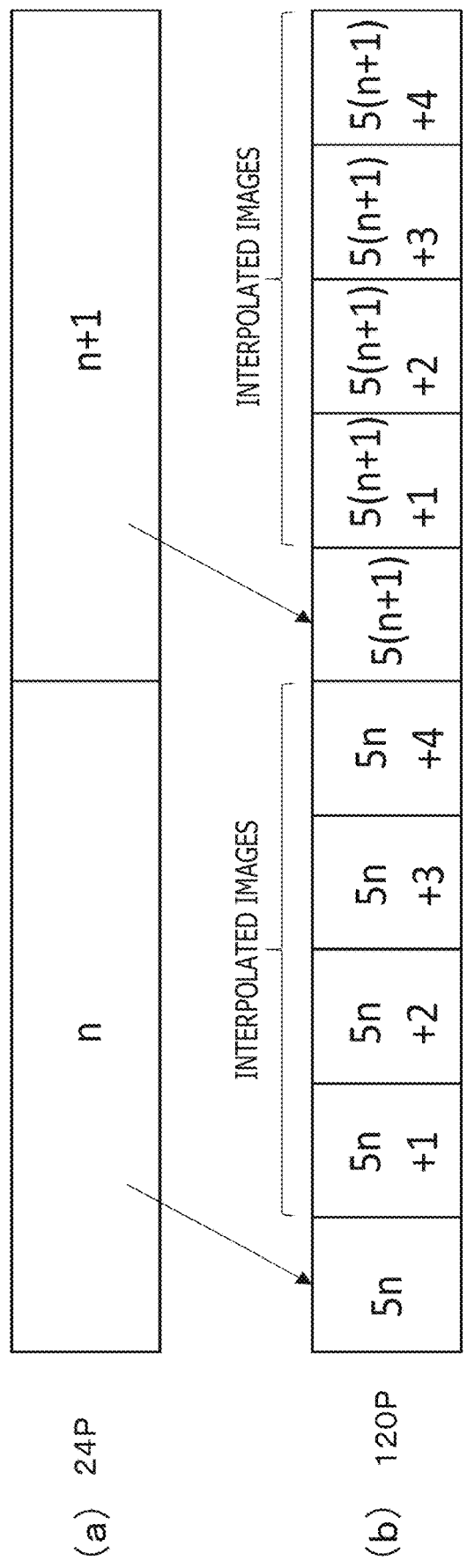
FIG. 3 is a diagram for describing an example of frame rate conversion from 24 Hz (24 P) to 120 Hz (120 P).

FIG. 3(a) illustrates two consecutive frames including an n-th frame and an (n+1)th frame of the 24 P frame-rate image stream, and FIG. 3(b) illustrates 120 P frame-rate images corresponding to the two consecutive frames. In this case, five frames including $5n$-th to $(5n+4)$th frames correspond to the n-th frame of the 24 P frame-rate image stream, the image of the $5n$-th frame is the same as the image of the n-th frame, and the images of four frames including $(5n+1)$th to $(5n+4)$th frames are interpolated images obtained by the motion compensation performed only on the target object.

Further, similarly, five frames including $5(n+1)$th to $(5(n+1)+4)$th frames correspond to the (n+1)th frame of the 24 P frame-rate image stream, the image of the $5(n+1)$th frame is the same as the image of the (n+1)th frame, and the images of four frames including $(5(n+1)+1)$th to $(5(n+1)+4)$th frames are interpolated images obtained by the motion compensation performed only on the target object.

Figure 4:
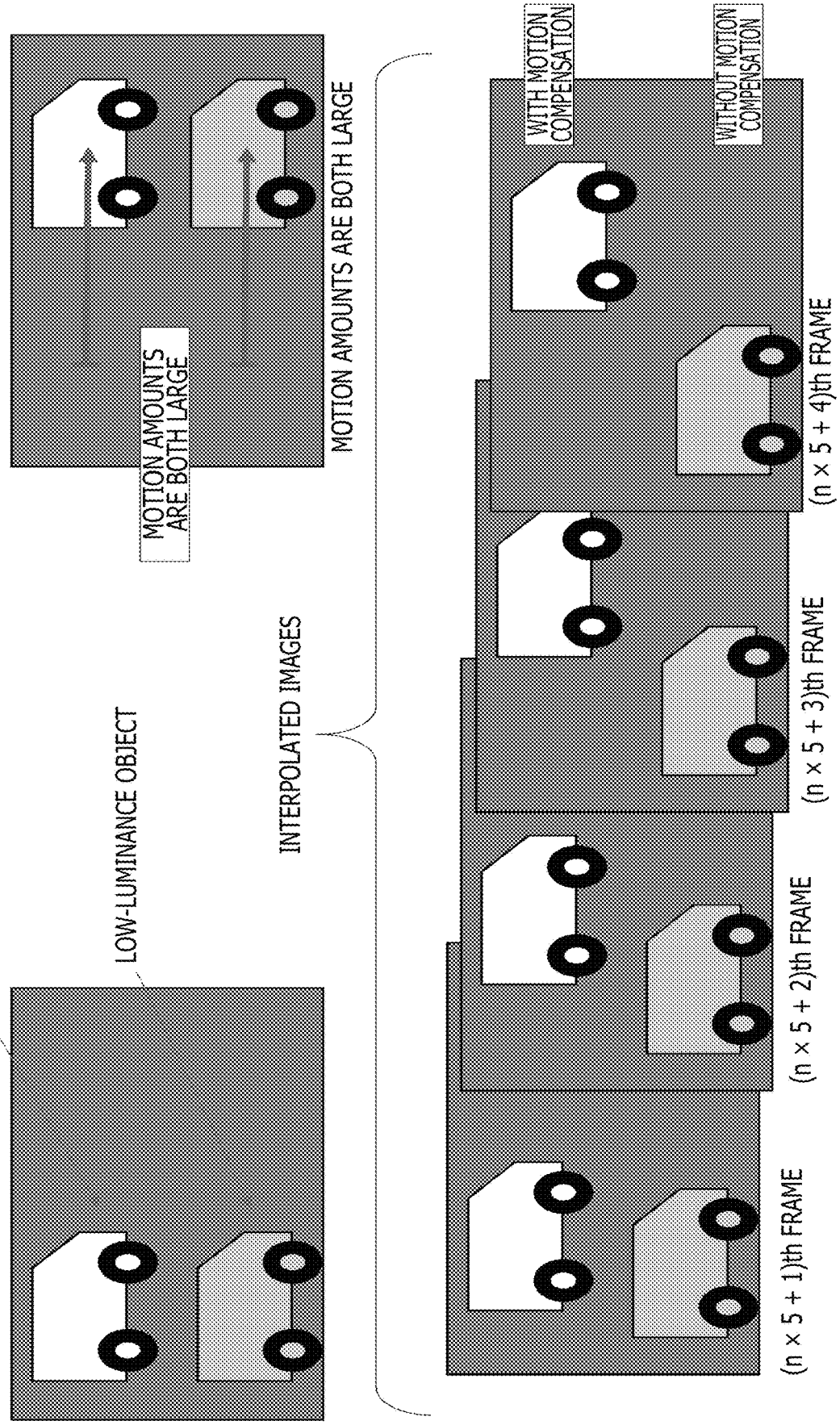
FIG. 4 is a diagram schematically illustrating an example of generation of interpolated images.

FIG. 4 schematically illustrates an example of generation of interpolated images. This example is an example in a case where a high-luminance object having a large motion amount and a low-luminance object having a large motion amount exist in the 24 P frame-rate image stream. Note that it is sufficient if the high-luminance object has high luminance in its partial portion, and the high-luminance object does not need to entirely have high luminance. This similarly applies to the following description.

The high-luminance object also has a large motion amount, and thus, it is detected as a target object. In each of the interpolated images of the four frames including the $(5n+1)$th to $(5n+4)$th frames, the high-luminance object is motion compensated and is placed at a sequentially moved position. By contrast, the low-luminance object has a large motion amount but has low luminance, and thus, it is not motion compensated. The low-luminance object is placed at a position same as that in the image of the $5n$-th frame, in each of the interpolated images of the four frames including the $(5n+1)$th to $(5n+4)$th frames.

Figure 5:
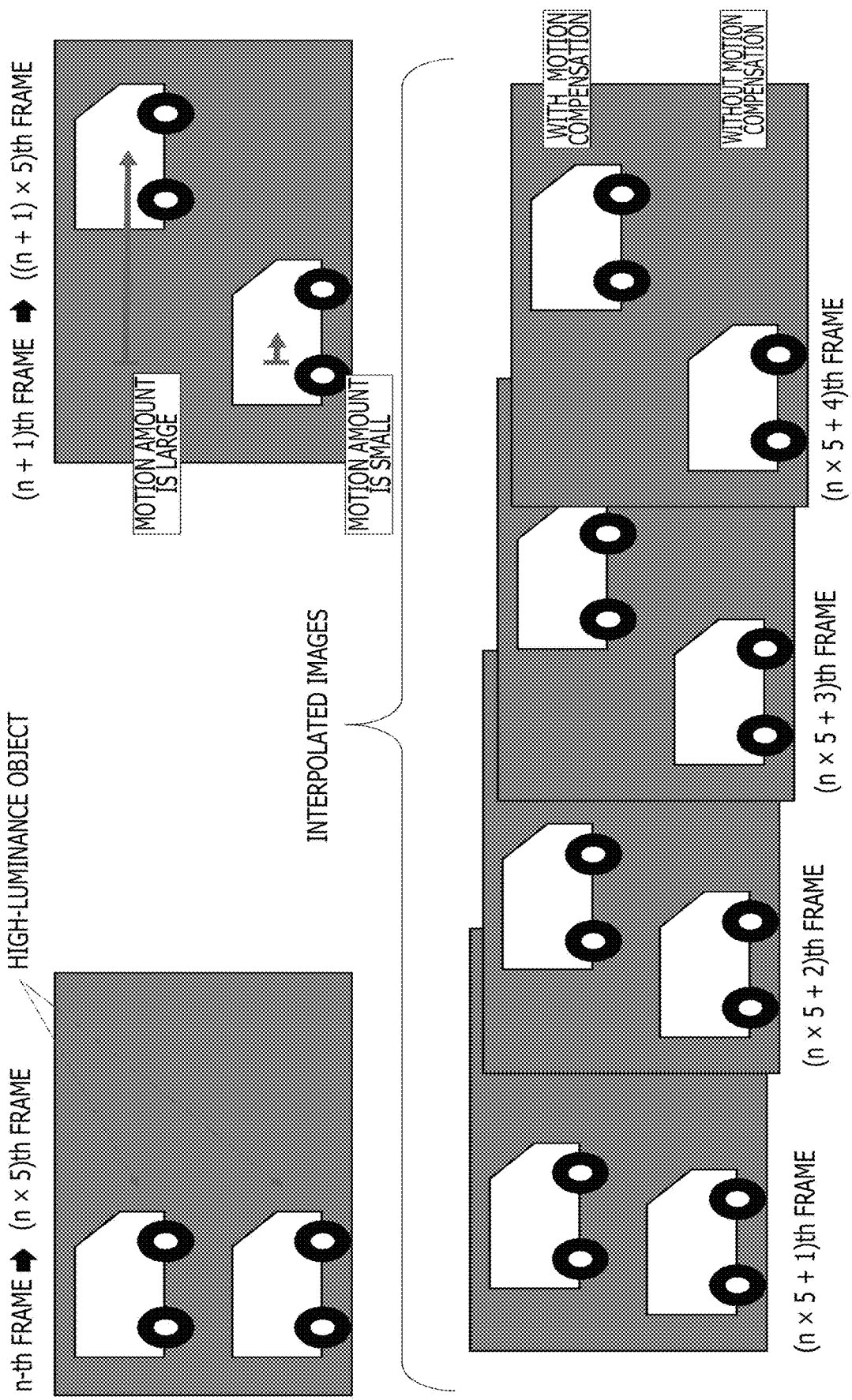
FIG. 5 is a diagram schematically illustrating another example of generation of interpolated images.

FIG. 5 schematically illustrates another example of generation of interpolated images. This example is an example in a case where a high-luminance object having a large motion amount and another high-luminance object having a small motion amount exist in the 24 P frame-rate image stream.

The high-luminance object having a large motion amount is detected as a target object, and in each of the interpolated images of the four frames including the $(5n+1)$th to $(5n+4)$th frames, this high-luminance object is motion compensated and is placed at a sequentially moved position. By contrast, the high-luminance object having a small motion amount is not motion compensated and is placed at a position same as that in the image of the $5n$-th frame, in each of the interpolated images of the four frames including the $(5n+1)$th to $(5n+4)$th frames.

Figure 6:
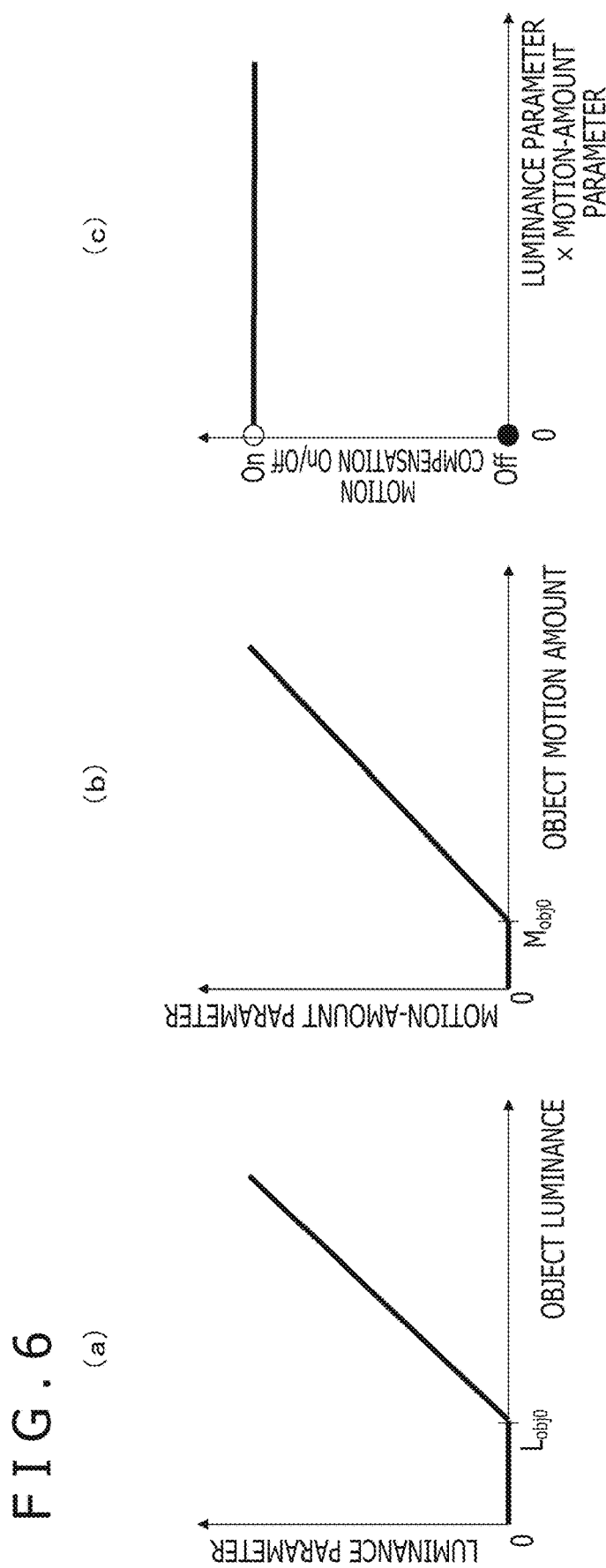
FIG. 6 is a diagram illustrating examples of correspondence between object luminance and a luminance parameter, correspondence between an object motion amount and a motion-amount parameter, and correspondence between the parameters and motion compensation.

As described above, a target object to be motion compensated in the interpolated images is an object having high luminance and a large motion amount. FIG. 6 (a) illustrates correspondence between object luminance and a luminance parameter. A luminance threshold value Lobj0 is a maximum value of object luminance in the 24 P frame-rate image stream at which value judder is unnoticeable. This luminance threshold value Lobj0 is an environmental parameter (variable) that changes according to brightness of a surrounding area (environment under which the images are viewed). With an increase in the object luminance beyond the luminance threshold value Lobj0, the luminance parameter lineally increases from zero. Note that it can also be considered that the luminance parameter is caused to nonlinearly change.

FIG. 6 (b) illustrates correspondence between an object motion amount and a motion-amount parameter. A motion-amount threshold value Mobj0 is a maximum value of an object motion amount in the 24 P frame-rate image stream at which value judder is unnoticeable. This motion-amount threshold value Mobj0 is an environmental parameter (variable) that changes according to a size of a display panel and a viewing distance. With an increase in the object motion amount beyond the motion-amount threshold value Mobj0, the motion-amount parameter lineally increases from zero. Note that it can also be considered that the motion-amount parameter is caused to nonlinearly change.

In the present technology, an object with respect to which a value obtained by multiplying the luminance parameter by the motion-amount parameter is larger than zero is detected as a target object to be motion compensated. In this case, as illustrated in FIG. 6 (c), for an object with respect to which a value obtained by multiplying the luminance parameter by the motion-amount parameter is equal to zero, the motion compensation is Off, that is, the motion compensation is not performed; whereas, for an object with respect to which a value obtained by multiplying the luminance parameter by the motion-amount parameter exceeds zero, the motion compensation is On, that is, the motion compensation is performed.

Figure 7:
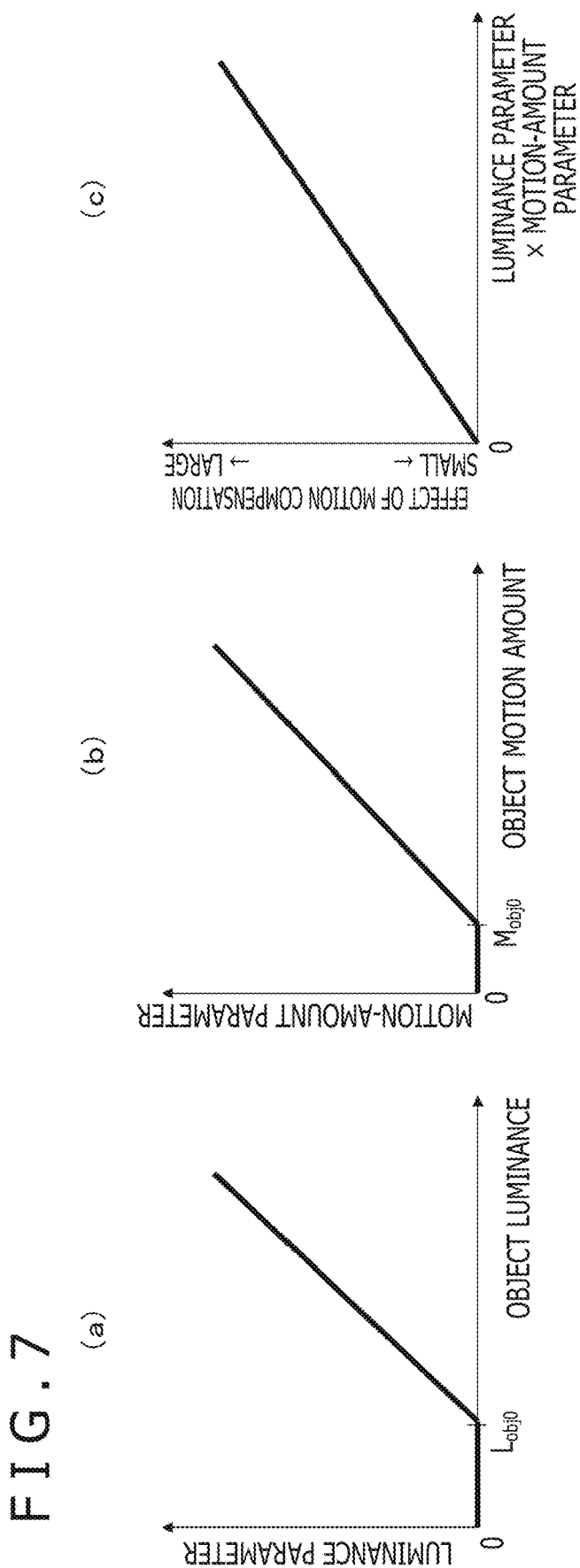
FIG. 7 is a diagram illustrating other examples of correspondence between object luminance and a luminance parameter, correspondence between an object motion amount and a motion-amount parameter, and correspondence between the parameters and motion compensation.

Note that it can also be considered that the effect of the motion compensation is not controlled between the two stages Off and On but is caused to change according to the value obtained by multiplying the luminance parameter by the motion-amount parameter. FIG. 7 (c) illustrates a case in which the effect of the motion compensation on a target object is caused to lineally change according to the value obtained by multiplying the luminance parameter by the motion-amount parameter. Note that, while detailed description of FIG. 7(a) and FIG. 7(b) is omitted, FIG. 7(a) and FIG. 7(b) are the same as FIG. 6(a) and FIG. 6(b), respectively. Note that it can also be considered that the effect of the motion compensation is caused to nonlinearly change.

The maximum of the effect of the motion compensation here is the same as that in the state in which the motion compensation is On as in FIG. 6(c). The motion compensation examples illustrated in above-described FIG. 4 and FIG. 5 each illustrate a case where the effect of the motion compensation is set to its maximum. Further, when the value obtained by multiplying the luminance parameter by the motion-amount parameter is equal to zero, the effect of the motion compensation is minimum, that is, the effect of the motion compensation is the same as that in the state in which the motion compensation is Off as in FIG. 6(c).

Figure 8:
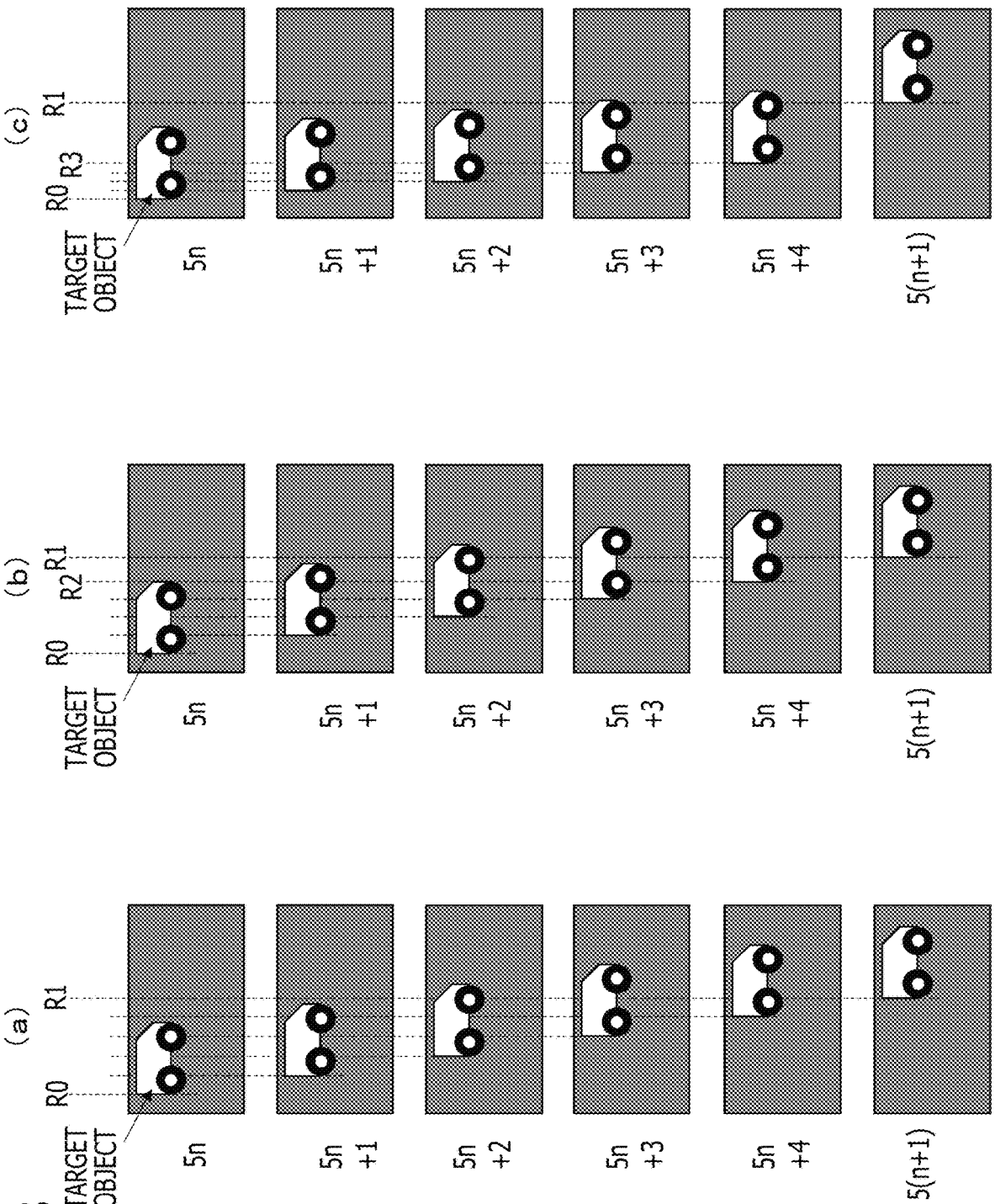
FIG. 8 is a diagram illustrating examples of changes in an effect of motion compensation.

FIG. 8 illustrates examples of changes in the effect of the motion compensation. FIG. 8(a) illustrates a case where the effect of the motion compensation is maximum. In this case, when the position of a target object in the image of the 5n-th frame is denoted by R0 and the position of the target object in the image of the 5(n+1)th frame is denoted by R1, a distance between R0 and R1 is equally divided into, for example, five sections, and the positions of the target object in the interpolated images of the four frames including the (5n+1)th to (5n+4)th frames are set to boundaries of the five sections.

FIG. 8(b) illustrates a case where the effect of the motion compensation is smaller than that in the case of FIG. 8(a). In this case, a position slightly closer to R0 than R1 is denoted by R2, a distance between R0 and R2 is equally divided into, for example, four sections, and the positions of the target object in the interpolated images of the four frames including the (5n+1)th to (5n+4)th frames are set to boundaries of the four sections and R2. Further, FIG. 8(c) illustrates a case where the effect of the motion compensation is smaller than that in the case of FIG. 8(b). In this case, a position further slightly closer to R0 than R2 is denoted by R3, a distance between R0 and R3 is equally divided into, for example, four sections, and the positions of the target object in the interpolated images of the four frames including the (5n+1)th to (5n+4)th frames are set to boundaries of the four sections and R3.

[Television Receiver]

Figure 9:
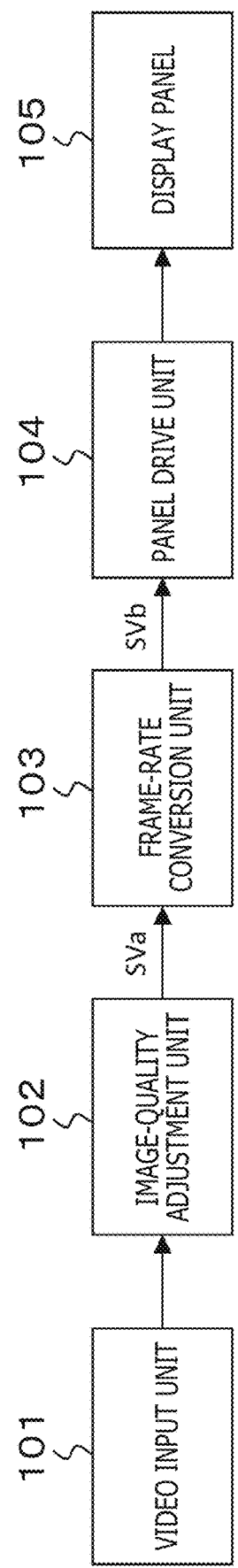
FIG. 9 is a block diagram illustrating a configuration example of a television receiver as an embodiment.

FIG. 9 illustrates a configuration example of a television receiver 100 as an embodiment. The television receiver 100 includes a video input unit 101, an image-quality adjustment unit 102, a frame-rate conversion unit 103, a panel drive circuit 104, and a display panel 105.

The video input unit 101 acquires a video signal by reception of a broadcasting signal, communication, or reproduction of a storage (disk). It is assumed here that the video signal corresponds to an image stream having a frame rate of 24 Hz and related to movie content. In the case of the broadcasting signal, the 24 Hz frame-rate video signal related to the movie content is transmitted thereto in a state of being converted into a 60 Hz (60 P) frame-rate video signal by means of, for example, the 2-3 pull-down method at a broadcasting station side. The video input unit 101 receives the 60 Hz frame-rate video signal and extracts individual frames of the original 24 Hz frame-rate video signal related to the movie content from the received 60 Hz frame-rate video signal, thereby reconstructing the 24 Hz frame-rate video signal related to the movie content.

The image-quality adjustment unit 102 performs image-quality adjustment processing for adjusting brightness, contrast, sharpness, and the like on the video signal acquired by the video input unit 101. The frame-rate conversion unit 103 performs processing for converting the frame rate from 24 Hz to 120 Hz on a video signal SVa output from the image-quality adjustment unit 102, and outputs a video signal SVb corresponding to an image stream having the frame rate of 120 Hz.

Figure 10:
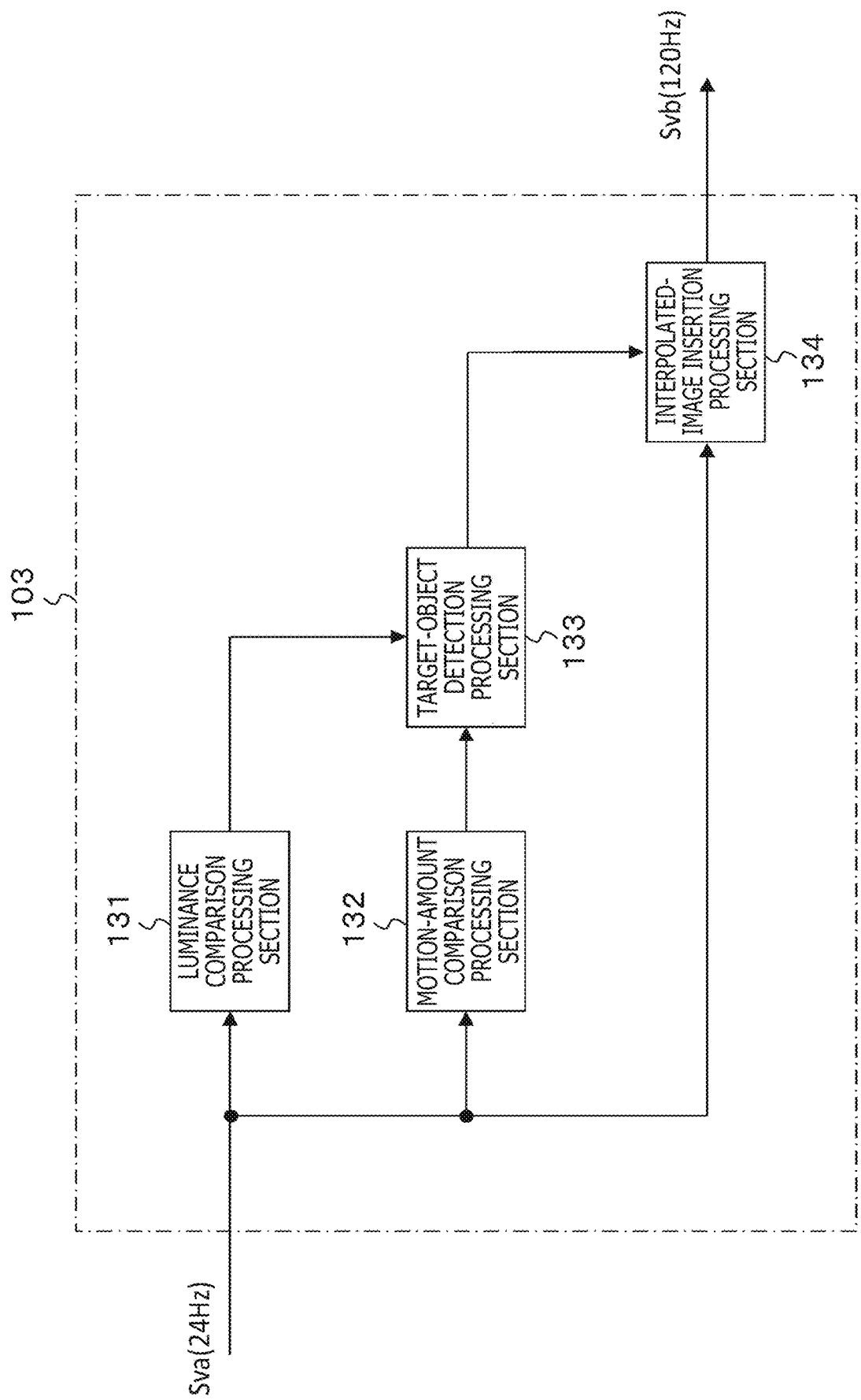
FIG. 10 is a block diagram illustrating a configuration example of a frame-rate conversion unit.

FIG. 10 illustrates a configuration example of the frame-rate conversion unit 103. The frame-rate conversion unit 103 includes a luminance comparison processing section 131, a motion-amount comparison processing section 132, a target-object detection processing section 133, and an interpolated-image insertion processing section 134.

The luminance comparison processing section 131 receives an input of the video signal SVa corresponding to the image stream having the frame rate of 24 Hz and related to the movie content. The luminance comparison processing section 131 detects, for each frame, luminance in a predetermined unit, for example, in a unit of a macro block, compares the luminance of each unit portion with the luminance threshold value Lobj0 (see FIG. 6(a) and FIG. 7(a)), and acquires information regarding unit portions in the image that have luminance exceeding the luminance threshold value Lobj0. The information regarding the unit portions includes information regarding the luminance parameter (see FIG. 6(a) and FIG. 7(a)) in addition to position information.

The motion-amount comparison processing section 132 receives an input of the video signal SVa corresponding to the aforementioned image stream having the frame rate of 24 Hz and related to the movie content. The motion-amount comparison processing section 132 detects, for each frame, a motion vector in a predetermined unit, for example, in a unit of a macro block, compares a motion amount of each unit portion with the motion-amount threshold value Mobj0 (see FIG. 6(b) and FIG. 7(b)), and acquires information regarding unit portions in the image that have a motion amount exceeding the motion-amount threshold value Mobj0. The information regarding the unit portions includes information regarding a motion parameter (see FIG. 6(b) and FIG. 7(b)) in addition to the motion vector and the motion amount (magnitude of the motion vector).

The target-object detection processing section 133 is supplied, for each frame, with the information acquired by the luminance comparison processing section 131 and associated with the unit portions in the image that have luminance exceeding the luminance threshold value Lobj0, and the information acquired by the motion-amount comparison processing section 132 and associated with the unit portions in the image that have a motion amount exceeding the motion-amount threshold value Mobj0. On the basis of the information supplied in such a way as described above, the target-object detection processing section 133 detects, for each frame, an object that exists in the image and has luminance exceeding the luminance threshold value Lobj0 and a motion amount exceeding the motion-amount threshold value Mobj0 (corresponding to the high-luminance object having a large motion amount in the examples of FIG. 4 and FIG. 5) as a target object. Note that, while detailed description of a method for detecting an object is omitted, any of conventionally known methods may be used, for example.

The interpolated-image insertion processing section 134 is supplied with information regarding each target object detected by the target-object detection processing section 133. This information includes the position information, the motion vector, the luminance parameter, and the motion parameter that are associated with the target object. Further, the interpolated-image insertion processing section 134 also receives an input of the video signal SVa corresponding to the aforementioned image stream having the frame rate of 24 Hz and related to the movie content.

The interpolated-image insertion processing section 134 acquires the image stream having the frame rate of 120 Hz by inserting, between every pair of two consecutive frames in the image stream having the frame rate of 24 Hz, four frames of interpolated images, and outputs the video signal SVb corresponding to the image stream having the frame rate of 120 Hz. In this case, the interpolated-image insertion processing section 134 performs, in the four frames of interpolated images, the motion compensation for causing only target objects to sequentially move, on the basis of the information regarding each target object (see FIG. 4 and FIG. 5).

Further, in this case, the interpolated-image insertion processing section 134 performs the motion compensation as illustrated in FIG. 6(c) or the motion compensation as illustrated in FIG. 7(c), depending on, for example, predetermined settings. In the motion compensation as illustrated in FIG. 6(c), motion compensation that constantly makes its movement amount maximum is performed for each target object, regardless of the magnitude of the value obtained by multiplying the luminance parameter by the motion-amount parameter (see FIG. 8(a)). By contrast, in the motion compensation illustrated in FIG. 7(c), motion compensation is performed such that the larger the value obtained by multiplying the luminance parameter by the motion-amount parameter is, the larger the movement amount becomes (see FIG. 8(c), FIG. 8(b), and FIG. 8(a) in this order).

Note that a portion or the whole of the processing of each section of the frame-rate conversion unit 103 can also be performed by software processing executed by a computer.

Referring back to FIG. 9, the panel drive unit 104 drives the display panel 105 on the basis of the video signal SVb acquired by the frame-rate conversion unit 103 and corresponding to the image stream having the frame rate of 120 Hz to cause the display panel 105 to display the image stream having the frame rate of 120 Hz. The display panel 105 is a liquid crystal display panel, an organic EL display panel, a CLED (Crystal LED) panel, or the like. The display panel 105 is, for example, a 4 K-size display panel, an 8 K-size display panel, or the like.

Operation of the television receiver 100 illustrated in FIG. 9 will be briefly described. In the video input unit 101, a video signal corresponding to an image stream having the frame rate of 24 Hz and related to movie content is acquired by reception of a broadcasting signal, communication, or reproduction of a storage (a disk), and the acquired video signal is supplied to the image-quality adjustment unit 102. In the image-quality adjustment unit 102, image-quality adjustment processing for adjusting brightness, contrast, sharpness, and the like is performed on the video signal corresponding to the image stream having the frame rate of 24 Hz. A video signal SVa obtained as a result of the image-quality adjustment processing is supplied to the frame-rate conversion unit 103.

In the frame-rate conversion unit 103, processing for converting the frame rate from 24 Hz to 120 Hz is performed on the video signal SVa output from the image-quality adjustment unit 102, to thereby acquire a video signal SVb corresponding to the image stream having the frame rate of 120 Hz. In this case, four frames of interpolated images are inserted between every pair of two consecutive frames in the image stream having the frame rate of 24 Hz to acquire the image stream having the frame rate of 120 Hz. Here, in the four frames of interpolated images, only a target object having luminance exceeding the luminance threshold value Lobj0 and having a motion amount exceeding the motion-amount threshold value Mobj0 is motion compensated so as to sequentially move.

The video signal SVb acquired by the frame-rate conversion unit 103 and corresponding to the image stream having the frame rate of 120 Hz is supplied to the panel drive circuit 104. In the panel drive unit 104, the display panel 105 is driven on the basis of the video signal SVb, and the image stream having the frame rate of 120 Hz and related to the movie content is displayed on the display panel 105.

As described above, in the television receiver 100 illustrated in FIG. 9, the frame-rate conversion unit 103 inserts four frames of interpolated images obtained by performing the motion compensation for causing only the target object having luminance exceeding the luminance threshold value and a motion amount exceeding the motion-amount threshold value to sequentially move, between every pair of two consecutive frames in the image stream having the frame rate of 24 Hz, thereby acquiring the image stream having the frame rate of 120 Hz. Therefore, even with a high-luminance and high-contrast television set, it is possible to make a favorable display of images of movie content in a state in which judder is unnoticeable but suitable judder remains.

<2. Modification Examples>

Note that, in the above-described embodiment, an object having luminance exceeding a luminance threshold value and a motion amount exceeding a motion-amount threshold value is determined as a target object to be motion compensated, but it can also be considered that an object having luminance exceeding the luminance threshold value or an object having a motion amount exceeding the motion-amount threshold value is determined as a target object to be motion compensated.

Further, in the above-described embodiment, a target object to be motion compensated is determined without taking a size of the object into consideration, but it can also be considered that only an object having a size exceeding a size threshold value is determined as a target object to be motion compensated.

Further, although not described above, in a case where a user sets a movie mode in image-quality mode setting, or in a case where movie content is detected in an automatic mode, the above-described frame rate conversion in the present technology can be applied.

Further, while the preferred embodiment of the present disclosure has been described in detail referring to the accompanying drawings, the technical scope of the present disclosure is not limited to such an example. It is obvious that any person having normal knowledge in the technical field of the present disclosure is able to conceive of various change examples or modification examples within the range of the technical idea described in the claims, and naturally, it is understood that these examples also belong to the technical scope of the present disclosure.

Further, the effects described in the present description are merely illustrative or exemplificative, and are not restrictive. That is, the technology according to the present disclosure may bring about, in addition to the above effects or instead of the above effects, other effects that are obvious for those skilled in the art from the description of the present description.

Further, the present technology can also have configurations as described below.

(1) An image processing device including:
a target-object detection processing section that, on the basis of an image stream having a first frame rate, detects, for each frame, an object having luminance exceeding a luminance threshold value and/or a motion amount exceeding a motion-amount threshold value, as a target object; and
an interpolated-image insertion processing section that acquires an image stream having a second frame rate larger than the first frame rate by inserting, between every pair of two consecutive frames in the image stream having the first frame rate, a predetermined number of frames of interpolated images obtained by performing motion compensation for causing the target object to sequentially move.

(2) The image processing device according to (1), in which the luminance threshold value includes a maximum value of object luminance at which judder is unnoticeable in the image stream having the first frame rate.

(3) The image processing device according to (1) or (2), in which the motion-amount threshold value includes a maximum value of an object motion amount at which judder is unnoticeable in the image stream having the first frame rate.

(4) The image processing device according to any one of (1) to (3), in which the luminance threshold value and the motion-amount threshold value each include a variable that changes according to an environment.

(5) The image processing device according to any one of (1) to (4), in which the interpolated-image insertion processing section causes a movement amount of the target object in the predetermined number of interpolated images to be changed according to the luminance and/or the motion amount of the target object.

(6) The image processing device according to any one of (1) to (5), in which the image stream having the first frame rate includes an image stream having a frame rate of 24 Hz and related to movie content.

(7) The image processing device according to (6), in which the second frame rate includes an image stream having a frame rate of 120 Hz.

(8) The image processing device according to any one of (1) to (7), further including:
a display panel that displays the image stream having the second frame rate.

(9) The image processing device according to (8), in which the display panel includes a 4K-size or 8K-size display panel.

(10) The image processing device according to any one of (1) to (9), in which the image stream having the first frame rate is acquired by reception of a broadcasting signal, reproduction from a storage, or communication.

(11) The image processing device according to any one of (1) to (10), in which the target-object detection processing section detects, as the target object, an object having a size exceeding a size threshold value in addition to luminance exceeding the luminance threshold value and/or a motion amount exceeding the motion-amount threshold value.

(12) An image processing method including:
a procedure of, on the basis of an image stream having a first frame rate, detecting, for each frame, an object having luminance exceeding a luminance threshold value and/or a motion amount exceeding a motion-amount threshold value, as a target object; and
a procedure of acquiring an image stream having a second frame rate larger than the first frame rate by inserting, between every pair of two consecutive frames in the image stream having the first frame rate, a predetermined number of frames of interpolated images obtained by performing motion compensation for causing the target object to sequentially move.

REFERENCE SIGNS LIST

100: Television receiver
101: Video input unit
102: Image-quality adjustment unit
103: Frame-rate conversion unit
104: Panel drive unit
105: Display panel
131: Luminance comparison processing section
132: Motion-amount comparison processing section
133: Target-object detection processing section
134: Interpolated-image insertion processing section

The invention claimed is:
1. An image processing device comprising:
a circuitry configured to
detect for each frame in an image having a first frame rate, a target object in accordance with its motion amount; and
obtain an image stream having a second frame rate larger than the first frame rate by inserting, between consecutive frames in the image stream having the first frame rate, a number of frames of interpolated images by performing motion compensation of the target object.

2. The image processing device according to claim 1, wherein the circuitry is configured to detect target object having a motion amount exceeding a motion amount threshold value.

3. The image processing device according to claim 2, wherein the motion amount threshold value includes a maximum value of an object motion amount at which judder is unnoticeable in the image stream having the first frame rate.

4. The image processing device according to claim 2, wherein the motion-amount threshold value includes a variable that changes according to an environment.

5. The image processing device according to claim 1, wherein the circuitry is configured to cause a movement amount of the target object in the number of interpolated images to be changed according to the motion amount of the target object.

6. The image processing device according to claim 1, wherein the first frame rate is a frame rate of 24 Hz and wherein the second frame rate is a frame rate of 120 Hz.

7. The image processing device according to claim 1, further comprising:
a display panel configured to display the image stream having the second frame rate.

8. The image processing device according to claim 7, wherein the display panel includes a 4 K-size or 8 K-size display panel.

9. The image processing device according to claim 1, wherein the circuitry is configured to obtain the image stream having the first frame rate by reception of a broadcasting signal, reproduction from a storage, or communication.

10. The image processing device according to claim 1, wherein the circuitry is configured to detect the target object, in case the target object has a size exceeding a size threshold value.

11. An image processing method comprising:
detecting for each frame in an image stream having a first frame rate, a target object in accordance with its motion amount; and
obtaining an image stream having a second frame rate larger than the first frame rate by inserting, between consecutive frames in the image stream having the first frame rate, a number of frames of interpolated images by performing motion compensation of the target object.

12. An image processing method according to claim 11, comprising detecting the target object having a motion amount exceeding a motion amount threshold value.

13. The image processing method according to claim 11, comprising causing a movement amount of the target object in the number of interpolated images to be changed according to the motion amount of the target object.

14. An image processing device comprising:
circuitry configured to:
detect for each frame in an image stream having a first frame rate, a target object in accordance with its luminance; and
obtain an image stream having a second frame rate larger than the first frame rate by inserting, between consecutive frames in the image stream having the first frame rate, a number of frames of interpolated images by performing motion compensation of the target object.

15. The image processing device according to claim 14, wherein the circuitry is configured to detect the target object having a luminance exceeding a luminance threshold value.

16. The image processing device according to claim 15, wherein the luminance threshold value includes a maximum value of object luminance at which judder is unnoticeable in the image stream having the first frame rate.

17. The image processing device according to claim 15, wherein the luminance threshold value includes a variable that changes according to an environment.

18. The image processing device according to claim 14, wherein the first frame rate is a frame rate of 24 Hz and wherein the second frame rate is a frame rate of 120Hz.

19. The image processing device according to claim 14, further comprising:
a display panel configured to display the image stream having the second frame rate.

20. An image processing method comprising:
detecting for each frame in an image stream having a first frame rate, a target object in accordance with its luminance; and
obtaining an image stream having a second frame rate larger than the first frame rate by inserting, between consecutive frames in the image stream having the first frame rate, a number of frames of interpolated images by performing motion compensation of the target object.

21. An image processing method according to claim 20, comprising detecting the target object having a luminance exceeding a luminance threshold value.

* * * * *